United States Patent [19]
Nedderman, Jr. et al.

[11] Patent Number: 5,462,000
[45] Date of Patent: Oct. 31, 1995

[54] NON-TURBULENT PULL DOWN EYE FOR BUOYANT TEST VEHICLE

[75] Inventors: William H. Nedderman, Jr., Middletown; Robert Meunier, Portsmouth, both of R.I.

[73] Assignee: The United States of America as represented by the Secretary of the Navy, Washington, D.C.

[21] Appl. No.: 360,475

[22] Filed: Dec. 21, 1994

[51] Int. Cl.⁶ ........................................ B63B 21/58
[52] U.S. Cl. .......................... 114/249; 441/7; 114/218
[58] Field of Search ........................... 114/218, 230, 114/242, 244, 245, 246, 247, 249, 250, 251, 253; 441/2, 7, 8, 9, 10, 11, 23

[56] References Cited

U.S. PATENT DOCUMENTS

| | | | |
|---|---|---|---|
| 3,897,746 | 8/1975 | Jamieson | 114/218 |
| 4,788,927 | 12/1988 | Casey | 114/218 |
| 4,890,566 | 1/1990 | Morris | 114/218 |

Primary Examiner—Jesus D. Sotelo
Attorney, Agent, or Firm—Michael J. McGowan; Prithvi C. Lall; Michael F. Oglo

[57] ABSTRACT

A non-turbulent, retractable pull-down eye assembly for use in hauling a buoyant test vehicle down to a release depth. The assembly is contained within the tail housing of the vehicle and is extended from the tail housing when the vehicle is to be hauled down. A hook and cable is attached through an eye in the extended portion of the assembly and the cable is winched to pull the vehicle below the surface. When the buoyant test vehicle reaches the prescribed depth, an acoustic signal is used to release the hook. The assembly is spring loaded within the tail housing such that, upon release from the hook, the extended portion retracts back into the tail housing as the vehicle rises to the surface. The exposed surface of the assembly when in the retracted position is shaped to conform to the shape of the buoyant test vehicle tail housing. The pull-down eye assembly thus retracted does not contribute to any turbulence around the tail housing during vehicle ascent.

14 Claims, 4 Drawing Sheets

5,462,000

NON-TURBULENT PULL DOWN EYE FOR BUOYANT TEST VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to retractable hook eyes and more particularly to a retractable pull-down eye for use in hauling a buoyant test vehicle (BTV) down to a release depth below a water surface. The eye is spring loaded to retract into the tail housing of the BTV when released and is shaped to conform to the contour of the tail section of the BTV to minimize turbulence. Channels within the eye or other means are provided to allow water to escape as the eye retracts into its housing. A tapped hole is provided in the eye to extend the eye when attaching the pull-down hook.

(2) Description of the Prior Art

BTV systems are used to test noise generated by shapes moving through a fluid medium. The BTV is configured to conform to the desired shape, hauled down below the water surface and released. Noise measurements are taken as the BTV rises to the surface. Current BTV's use a pull-down eye attached to the tail piece of the BTV together with a well known Benthos acoustic deep sea release. A cable is attached to the eye and the BTV is pulled below the surface. When the desired depth is reached, an acoustic signal is transmitted to the Benthos release which causes the hook on the Benthos release device to open allowing the BTV to ascend. The pull-down eye attached to the ascending BTV generates extraneous noise not corresponding to the shape being tested. To eliminate the extraneous noise, a non-turbulent pull-down eye is required. Further, the pull-down eye must be non-turbulent almost immediately upon release, such that noise measurements will not be adversely impacted.

Lovejoy in U.S. Pat. No. 4,331,096 discloses a retractable pad-eye device having a shape corresponding to the surrounding structure when in its retracted position. However, the device requires a manual operation to change between the pad-eye and the retracted positions. Such a device cannot be used with a self-releasing BTV at substantial depth below the water surface. Spring loaded pad-eyes or cleats are well known in the art. Such devices, as disclosed by Morris in U.S. Pat. No. 4,890,566 and Harris in U.S. Pat. No. 5,004,388, typically provide for the spring action to extend the cleat upon release, rather than retract. No current devices provide the non-turbulent shape combined with the quick retraction required for sensitive noise measurements.

SUMMARY OF THE INVENTION

Accordingly, it is a general purpose and object of the present invention to provide a pull-down eye for a BTV having a non-turbulent shape to minimize extraneous noise during BTV noise generation testing.

It is another object of the invention to have the pull-down eye automatically assume the non-turbulent configuration when the BTV is released.

Yet another object of the invention is to have the pull-down eye quickly retract from an extended position to the non-turbulent configuration.

A further object of the invention is to minimize noise during retraction.

A still further object is to provide means to extend the eye from the retracted position.

These objects are accomplished with the present invention by providing a pull-down eye assembly in the tail housing of a BTV. The shape of the pull-down eye assembly conforms to the general shape of the BTV tail housing such that the pull-down eye assembly does not create any additional turbulence while the BTV moves through the water. The pull-down eye is extended from the tail housing when the BTV is to be hauled down to the release depth. A cable is attached to the pull-down eye and the BTV is winched down to the test depth. The pull-down eye is spring loaded to automatically and quickly retract back to the non-turbulent configuration when released. Channels within the eye or other means are provided to allow water to escape from the housing as the eye retracts back into the tail housing. Resilient pads are provided between the pull-down eye assembly and the tail housing to eliminate any metal to metal contact noise as the pull-down eye comes to rest against the tail housing. During the BTV ascent test stage, the pull-down eye remains in the non-turbulent configuration. To prepare the BTV for another test ascent, the pull-down eye is extended by means of a tapped hole and the cable is re-attached.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
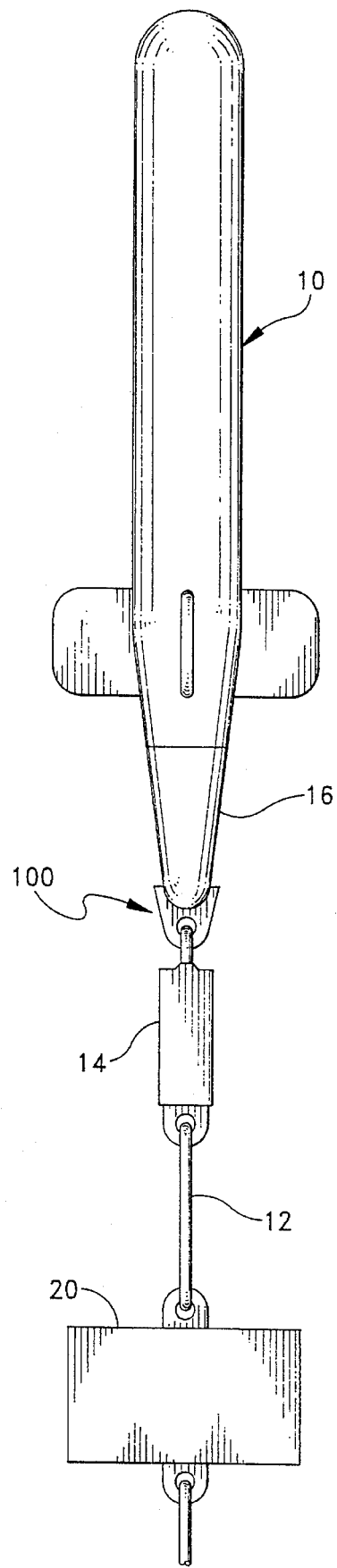
FIG. 1 shows a BTV with the pull-down eye extended being hauled down to test depth.
Figure 2:
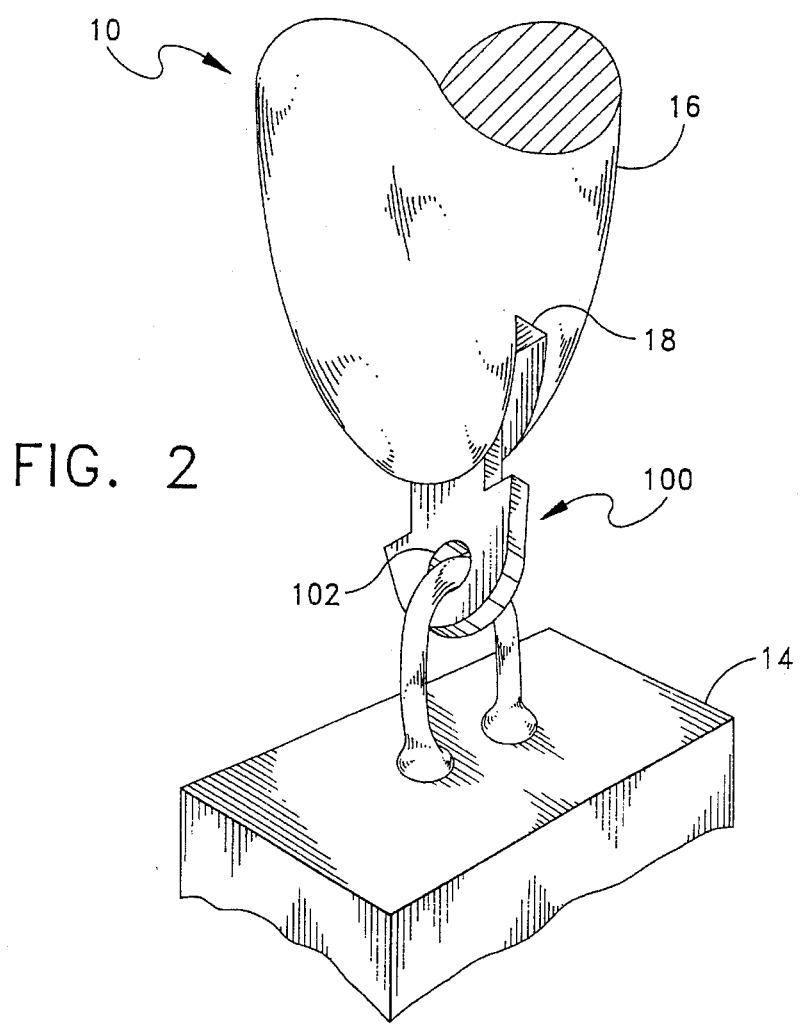
FIG. 2 shows a partial view of a tail housing of a BTV with the pull-down eye extended.

Referring now to FIG. 1, there is shown BTV 10 being hauled down to test depth by cable 12. Cable 12 is attached to BTV 10 by means of Benthos release device 14 hooked to pull-down eye assembly 100. Referring now additionally to FIG. 2, there is shown a partial view of BTV 10 in the haul down phase with pull-down eye assembly 100 extended from tail housing 16 of BTV 10. Tail housing 16 has a slot 18 to accept pull-down eye assembly 100. Benthos release device 14 attaches to pull-down eye assembly 100 through eye aperture 102. BTV 10 is positively buoyant and thus assumes a vertical position during haul down. FIG. 1 shows cable 12 attached to a winch (not shown) via float 20. When the proper test depth is reached, an acoustic signal is transmitted to Benthos release device 14 causing it to release pull-down eye assembly 100.

Figure 3:
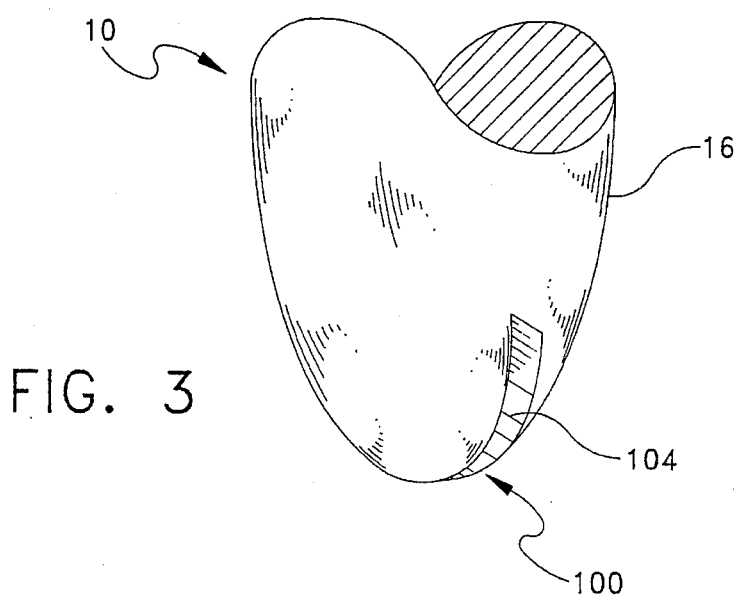
FIG. 3 shows a partial view of a tail housing of a BTV with the pull-down eye retracted.

Referring now to FIG. 3, there is shown a partial view of BTV 10 in the ascent stage after BTV 10 has been released. Pull-down eye assembly 100 is retracted into tail housing 16 with exposed surface 104 of pull-down eye assembly 100 conforming to the general shape of tail housing 16.

Figure 4:
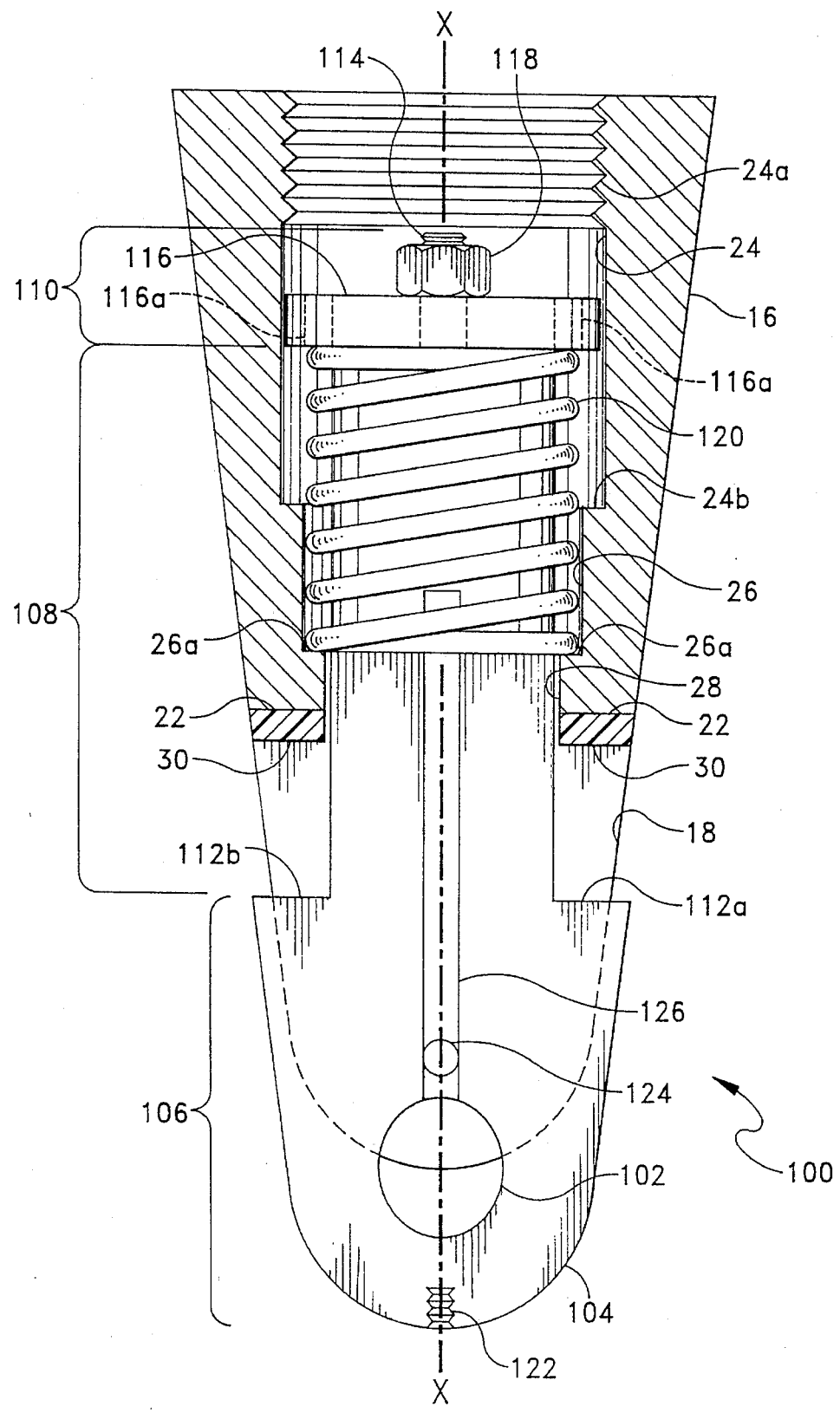
FIG. 4 shows a sectional view of a preferred embodiment of the pull-down eye assembly parallel to the plane of the pull-down eye with the pull-down eye extended from the tail housing of the BTV.

Referring now to FIG. 4, there is shown a cross-sectional view of tail housing 16 with pull-down eye assembly 100 shown therein. Assembly 100 is shown partially extended from tail housing 16. Exposed surface 104 is seen to conform to the generally cone-shaped tail housing 16 and to lie along conical axis X—X. In the preferred embodiment of FIG. 4, assembly 100 is fabricated from flat stock having and eye end 106, a middle portion 108 and a forward end 110. Eye end 106 comprises eye aperture 102 and exposed surface 104. Eye end 106 is wider than middle portion 108, forming faces 112a and 112b, symmetric about axis X—X. When retracted, faces 112a and 112b rest against base 22 of slot 18. At forward end 110, the flat stock is rounded to form threaded shaft 114. Retainer ring 116 fits onto shaft 114 and nut 118 is threaded onto shaft 114 to secure retainer ring 116 onto shaft 114. Middle portion 108 and forward end 110 fit within a series of coaxial bores, 24, 26 and 28, within tail housing 16. First bore 24 has a threaded end 24a for attaching tail housing 16 to BTV 10 (not shown). The other end forms stop 24b. Second bore 26 has a smaller diameter than first bore 24 and extends from stop 24b further into tail housing 16 along axis X—X ending at shoulder 26a. Third bore 28 has a diameter smaller than second bore 26 and slightly larger than middle portion 108. Third bore 28 extends from shoulder 26a to intersect slot 18. Spring 120 surrounds middle portion 108 and extends between shoulder 26a and retainer ring 116. Retainer ring 116 is slightly smaller in diameter than bore 24 allowing movement of assembly 100 along axis X—X. As eye end 106 is extended away from tail housing 16, spring 120 is compressed between retainer ring 116 and shoulder 26a until retainer ring 116 rests against stop 24b. A small threaded bore 122 is provided in exposed surface 104 aligned with axis X—X for use in pulling eye end 106 away from tail housing 16 after having been retracted flush with tail housing 16. A further bore 124 is provided through eye end 106, perpendicular to the plane of assembly 100 and spaced slightly apart from eye aperture 102 in the direction of middle portion 108. Eye end 106 is extended such that further bore 124 extends past tail housing 16. A pin (not shown) is inserted in further bore 124 to keep eye end 106 extended until attachment of Benthos device 14 (not shown in FIG. 4, but illustrated in FIG. 1). Once Benthos device 14 is attached, the pin may be removed as Benthos device 14 will serve to hold eye end 106 extended. When Benthos device 14 releases eye end 106, spring 120 expands away from shoulder 26a, retracting eye end 106 into slot 18 until faces 112a and 112b come to rest against base 22. In the preferred embodiment, rubber silencers 30 are affixed to base 22 such that faces 112a and 112b come to rest on silencers 30 thus attenuating any noise generated from faces 112a and 112b contacting base 22. Slots 126 extend from eye aperture 102 towards forward end 110, parallel to axis X—X on either side of middle portion 108 and allow water within bores 24, 26 and 28 to escape as eye end 106 retracts. Similarly, retainer ring 116 has flow apertures 116a allowing water to flow past retainer ring 116 as spring 120 expands and pushes retainer ring 116 through first bore 24.

Figure 5:
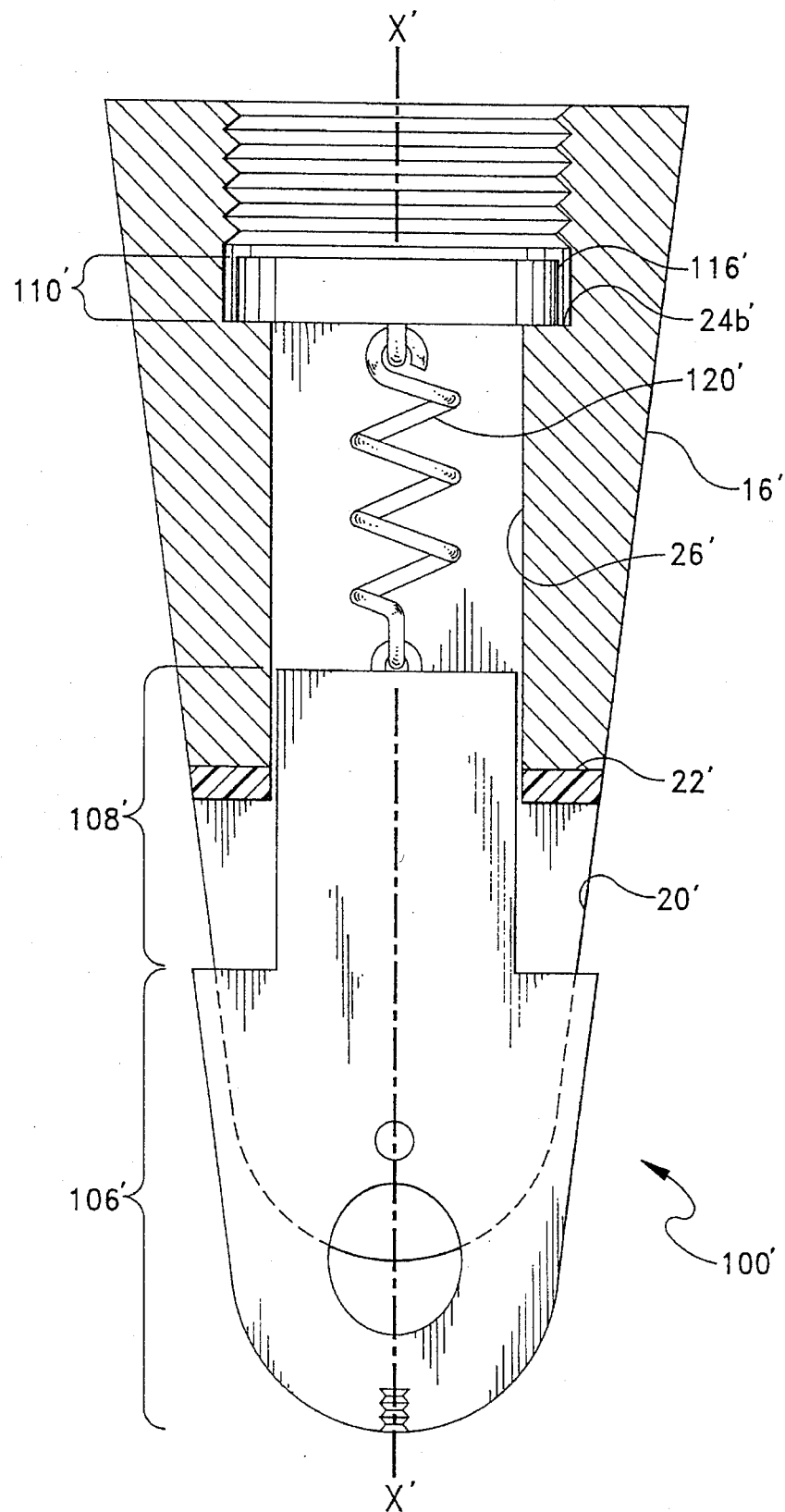
FIG. 5 shows a sectional view of an alternate embodiment of the pull-down eye assembly parallel to the plane of the pull-down eye with the pull-down eye extended from the tail housing of the BTV.

Referring now to FIG. 5 there is shown an alternate embodiment of pull-down eye assembly 100' with spring 120' extended between and attached to middle portion 108' and forward end 110' As eye end 106' is extended from tail housing 16', spring 120' is stretched. When Benthos device 14 (not shown in FIG. 5) releases eye end 106', spring 120' contracts thus retracting eye end 106' into slot 18'. In the alternate embodiment of FIG. 5, second bore 26' extends to base 22' of slot 18'. Retainer ring 116' is held tight against stop 24b' by the action of spring 120'.

Pull-down eye assembly 100 of the present invention has many advantages over the prior art. The retraction of assembly 100 into tail housing 16, combined with exposed surface 104 of assembly 100 conforming to the shape of tail housing 16, eliminate turbulence caused by a protruding eye. Additionally, tail housing 16 and retracted assembly 100 are shaped to provide a non-turbulent flow over their surfaces, thus minimizing extraneous noise during BTV 10 testing. In the preferred embodiment, spring 120 is compressed as BTV 10 is hauled down below the surface. Once Benthos device 14 releases BTV 10, the expansion action of spring 120 automatically causes assembly 100 to quickly retract into tail housing 16. The use of slots 126 and flow apertures 116a provide adequate flow channels for water to escape from bores 24, 26 and 28 as assembly 100 retracts into tail housing 16, further decreasing retraction time. Rubber silencers 30 substantially quiet the contact of faces 112a and 112b against base 22. Finally, threaded bore 122 provides means for extracting assembly 100 from tail housing 16 in preparation of further BTV 10 tests.

What has thus been described is a non-turbulent, retractable pull-down eye assembly for use in hauling a BTV down to a release depth. The assembly is contained within the tail housing of the BTV. The exposed surface of the assembly when in the retracted position is shaped to conform to the shape of the BTV tail housing. When a BTV is to be hauled down, the assembly is extended from the tail housing. A hook and cable is attached through an eye in the extended portion of the assembly and the cable is winched to pull the BTV below the surface. When the BTV reaches the prescribed depth, an acoustic signal is used to release the hook. The assembly is spring loaded within the tail housing such that, upon release from the hook, the extended portion retracts back into the tail housing as the BTV rises to the surface.

Obviously many modifications and variations of the present invention in addition to the preferred and alternate embodiments may become apparent in light of the above teachings. For example, the spring can be replaced with any compressible or extensible material which will allow the extension of the pull-down eye and provide a retracting force when the eye is released. Further, the shape of the eye can be round, oval or any geometry corresponding to the hook used to haul down the BTV. Rather than providing slots for water escape, the clearance between the assembly and the tail housing can be increased allowing water to flow around the full assembly as it retracts into the tail housing. Also, the silencers can be mounted to either the assembly or the tail section and may be of any resilient material which will attenuate noise.

In light of the above, it is therefore to be understood that within the scope of the appended claims, the invention may be practiced otherwise than as specifically described.

What is claimed is:

1. A retractable pull-down eye device comprising:
   an open housing having an inner surface forming an opening therethrough generally along a centerline of the housing, the housing having an exterior surface;

an eye portion having an eye aperture therethrough, the eye portion being movable between a retracted position wherein said eye portion is recessed within the opening, an outer surface of the eye portion being flush with the exterior surface of the housing, and an extended position wherein the eye portion projects out of the opening and the eye aperture is accessible for connection of a pull-down device;

a body portion affixed to the eye portion remote from the outer surface, the body portion being within the opening for retaining the device within the housing; and a biasing means within the opening for resisting movement of the eye portion from the retracted position to the extended position and for providing a force to return the eye portion to the retracted position.

2. The device of claim 1, wherein:

the inner surface further comprises two parallel faces spaced apart equidistant from the centerline of the housing, the parallel faces intersecting the exterior surface in a generally perpendicular manner, the parallel faces extending to a base surface perpendicular to the parallel faces, the base surface extending between the parallel faces, the parallel faces and base surface forming a slot through the housing; and the eye portion is formed from a flat plate having a thickness, the aperture being generally perpendicular to the flat plate, the thickness being slightly less than the distance between the parallel faces, the eye portion in the retracted position fitting within the slot formed by the slotted portion of the housing, the eye portion bearing against the base surface when in the retracted position preventing further movement of the eye portion into the opening.

3. The device of claim 2 wherein:

the inner surface further comprises a first cylindrical surface and a second cylindrical surface, the first and second cylindrical surfaces coaxial with the centerline of the housing, the first cylindrical surface having a first diameter, the second cylindrical surface having a second diameter smaller than the first diameter, the first cylindrical surface extending from a point within the housing remote from the slotted portion in the direction of the slotted portion to an annular end surface, the annular end surface being perpendicular to the centerline of the housing, the annular end surface extending from the first cylindrical surface to the second cylindrical surface, the second cylindrical surface extending from the end surface to the base surface of the slotted portion; and the body portion further comprises a retainer end furthest from the eye portion, the retainer end being circumscribed by the first cylindrical surface, the retainer end having a dimension slightly less than the first diameter, the retainer end bearing against the annular end surface when the eye portion is in the extended position preventing further movement of the eye portion away from the housing.

4. The device of claim 3 wherein:

the second cylindrical surface further comprises an enlarged cylindrical surface, the enlarged cylindrical surface having a third diameter intermediate the first and second diameters, the enlarged cylindrical surface extending from the end surface to a shoulder surface, the shoulder surface being perpendicular to the centerline of the housing, the shoulder surface extending between the enlarged cylindrical surface to the second cylindrical surface; and said biasing means is a spring extending between and bearing against the shoulder surface and the retainer end.

5. The device of claim 4 wherein the retainer end further comprises:

a threaded shaft aligned with the centerline of the housing having a shaft diameter substantially less than the first diameter;

a retaining ring mounted on the shaft, the retaining ring having an inner diameter slightly larger than the shaft diameter and having an outer diameter slightly less than the first diameter; and a retaining nut threaded onto the shaft for securing the retaining ring onto the shaft.

6. The device of claim 5 wherein the outer surface further comprises a threaded aperture for attachment of a threaded fastener, a force being applied to the threaded fastener to extend the eye portion from the housing.

7. The device of claim 6 wherein the eye portion further comprises a pin aperture therethrough, the pin aperture being located between the eye aperture and the body portion, for accepting a holding pin, the holding pin preventing the eye portion from retracting into the housing, the holding pin being removed when the pull-down device is connected to the eye aperture.

8. The device of claim 7 wherein the housing is a tail housing of a buoyant test vehicle, the pull-down device being attached to the eye aperture for pulling the buoyant test vehicle to a test depth beneath a water surface, the pull-down device disconnecting from the eye aperture when the test depth is reached and releasing the buoyant test vehicle to ascend to the water surface, the eye portion retracting into the tail housing to present a non-turbulent profile as the buoyant test vehicle ascends.

9. The device of claim 8 further comprising at least one flow channel for allowing passage of water from within the housing to the exterior surface of the housing when the eye portion is retracting into the housing.

10. The device of claim 9 wherein the at least one flow channel further comprises:

flow apertures extending through the retaining ring; and a flow slot cut into the surface of the eye portion, the flow slot extending from the eye aperture towards the retaining end of the body portion, the slot having a length sufficient to maintain a portion of the slot circumscribed by the second cylindrical surface when the eye portion is in the extended position.

11. The device of claim 8 wherein the first cylindrical surface further comprises a threaded portion remote from the end surface, the threaded portion mating with the buoyant test vehicle for securing the tail housing to the buoyant test vehicle.

12. The device of claim 2 wherein the biasing means is a spring.

13. The device of claim 12 wherein:

the inner surface further comprises a first cylindrical surface and a second cylindrical surface, the first and second cylindrical surfaces coaxial with the centerline of the housing, the first cylindrical surface having a first diameter, the second cylindrical surface having a second diameter smaller than the first diameter, the first cylindrical surface extending from a point within the housing remote from the slotted portion in the direction of the slotted portion to an annular end surface, the annular end surface being perpendicular to the centerline of the housing, the annular end surface extending from the first cylindrical surface to the second cylindrical surface, the second cylindrical surface extending from the end surface to the base surface of the slotted portion;

the body portion further comprises a forward end affixed to the eye portion extending in the direction of the end surface, the forward end being circumscribed by the second cylindrical surface when the eye portion is in the retracted position;

the body portion further comprises a retainer end spaced apart from the forward end remote from the eye portion, the retainer end being circumscribed by the first cylindrical surface, the retainer end having a dimension slightly less than the first diameter; and the spring is affixed to the retainer end and the forward end in an extended fashion, the extension of the spring providing a force tending to bring the retainer end and the forward end together, the force bringing the retainer end to bear against the end surface, the force further limiting movement of the eye portion away from the housing.

14. The device of claim 2 further comprising at least one flow channel for allowing passage of water from within the housing to the exterior surface of the housing when the eye portion is retracting into the housing.

* * * * *